United States Patent
Miller et al.

(10) Patent No.: US 11,558,475 B1
(45) Date of Patent: Jan. 17, 2023

(54) SYSTEM AND METHOD FOR PROVIDING RECOMMENDATIONS BASED ON SYNCHRONOUS ACTIVITY

(71) Applicant: Match Group, LLC, Dallas, TX (US)

(72) Inventors: Kyle Garrett Miller, Hermosa Beach, CA (US); Joshua David Gafni, West Hollywood, CA (US); Adil Kadir, Los Angeles, CA (US)

(73) Assignee: MATCH GROUP, LLC, Dallas, TX (US)

( * ) Notice: Subject to any disclaimer, the term of this patent is extended or adjusted under 35 U.S.C. 154(b) by 0 days.

(21) Appl. No.: 17/401,930

(22) Filed: Aug. 13, 2021

(51) Int. Cl.
| | |
|---|---|
| *H04L 29/08* | (2006.01) |
| *H04L 67/51* | (2022.01) |
| *H04L 67/306* | (2022.01) |
| *H04L 67/1095* | (2022.01) |
| *H04L 67/54* | (2022.01) |
| *H04L 67/50* | (2022.01) |

(52) U.S. Cl.
CPC .......... *H04L 67/51* (2022.05); *H04L 67/1095* (2013.01); *H04L 67/306* (2013.01); *H04L 67/535* (2022.05); *H04L 67/54* (2022.05)

(58) Field of Classification Search
CPC ..... H04L 51/14; H04L 67/16; H04L 67/1095; H04L 67/22; H04L 67/24; H04L 67/306; H04L 67/51; H04L 67/54; H04L 67/535; A63F 13/795
See application file for complete search history.

(56) References Cited

U.S. PATENT DOCUMENTS

| | | | |
|---|---|---|---|
| 7,092,952 B1 | 8/2006 | Wilens | |
| 10,757,672 B1* | 8/2020 | Knas | H04W 8/005 |
| 10,762,190 B1* | 9/2020 | Cuan | G06Q 30/0277 |
| 2009/0198666 A1 | 8/2009 | Winston et al. | |
| 2013/0165234 A1* | 6/2013 | Hall | A63F 13/795 463/42 |

(Continued)

FOREIGN PATENT DOCUMENTS

KR  1020210055296 A  11/2019

OTHER PUBLICATIONS

PCT: Notification of Transmittal of the International Search Report and the Written Opinion of the International Searching Authority, or the Declaration; Int'l Appln No. PCT/US2022/074236; dated Nov. 16, 2022.

*Primary Examiner* — Jungwon Chang
(74) *Attorney, Agent, or Firm* — Baker Botts, LLP

(57) ABSTRACT

A system includes a processor and an interface. The processor determines that a first user takes a first action and a second user takes a second action, where the time period between the first action and the second action is less than a threshold. In response, the processor causes the system to transmit at least one of a suggestion associated with the first user for display to the second user or a suggestion associated with the second user for display to the first user. In response to the processor causing to transmit the suggestion associated with the second user, the interface receives an indication that the first user approves of the suggestion associated with the second user. In response to the processor causing to transmit the suggestion associated with the first user, the interface receives an indication that the second user approves of the suggestion associated with the first user.

17 Claims, 5 Drawing Sheets

(56) References Cited

U.S. PATENT DOCUMENTS

| | | | | |
|---|---|---|---|---|
| 2014/0129942 A1* | 5/2014 | Rathod | ............... | G06Q 50/01 |
| | | | | 715/720 |
| 2014/0279066 A1 | 9/2014 | Louis et al. | | |
| 2015/0341297 A1* | 11/2015 | Barfield, Jr. | ............ | H04L 51/14 |
| | | | | 709/206 |
| 2016/0239868 A1* | 8/2016 | Demsey | ............ | G06Q 30/0277 |
| 2019/0065609 A1 | 2/2019 | Finder | | |
| 2020/0324208 A1* | 10/2020 | Cleven | ................ | A63F 13/35 |
| 2021/0192611 A1* | 6/2021 | Kothari | ............ | G06Q 30/0213 |

\* cited by examiner

SYSTEM AND METHOD FOR PROVIDING RECOMMENDATIONS BASED ON SYNCHRONOUS ACTIVITY

TECHNICAL FIELD

This invention relates generally to the field of communications and, more particularly, to a system and method for providing recommendations based on synchronous activity.

BACKGROUND

Networking architectures, developed in communications environments, have grown increasingly complex in recent years. A multitude of protocols and configurations have been developed to accommodate a diverse group of end users having various networking needs. Many of these architectures have gained significant notoriety because they can offer the benefits of automation, convenience, management, and enhanced consumer selections. Using computing platforms with the networking architectures has allowed for increased communication, collaboration, and interaction. For example, certain network protocols may be used to allow an end user to connect online with other users who satisfy certain search requirements. These protocols may relate to job searches, person finding services, real estate searches, or online dating.

SUMMARY

Certain embodiments of the synchronous-activity-based recommendation tool are described below.

According to one embodiment, a system includes a processor and an interface coupled to the processor. The processor determines that a first user takes a first action at a first time, and that a second user takes a second action at a second time. The processor also determines that a time period between the first time and the second time is less than a threshold. In response to determining that the time period is less than the threshold, the processor causes to transmit a suggestion associated with the second user for display to the first user. In response to the processor causing to transmit the suggestion associated with the second user to the first user, the interface receives an indication that the first user approves of the suggestion associated with the second user.

According to another embodiment, a method includes determining, by a processor, that a first user takes a first action at a first time, and that a second user takes a second action at a second time. The method also includes determining, by the processor, that a time period between the first time and the second time is less than a threshold. In response to determining that the time period is less than the threshold, the method includes causing to transmit a suggestion associated with the second user for display to the first user. In response to causing to transmit the suggestion associated with the second user to the first user, the method includes receiving, by an interface, an indication that the first user approves of the suggestion associated with the second user.

According to a further embodiment, at least one computer-readable medium includes a plurality of instructions that, when executed by at least one processor, are configured to determine that a first user takes a first action at a first time, and that a second user takes a second action at a second time. The instructions, when executed by the at least one processor, are also configured to determine that a time period between the first time and the second time is less than a threshold. In response to determining that the time period is less than the threshold, the instructions, when executed by the at least one processor, are configured to cause to transmit a suggestion associated with the second user for display to the first user. In response to causing to transmit the suggestion associated with the second user for display to the first user, the instructions, when executed by the at least one processor, are configured to receive an indication that the first user approves of the suggestion associated with the second user. In response to receiving the indication that the first user approves of the suggestion associated with the second user, the instructions, when executed by the hardware processor, are configured to enable communication between the first user and the second user.

According to an embodiment, a system includes a processor and an interface coupled to the processor. The processor is configured to determine that a first user takes a first action and determine that a second user takes a second action. In response to determining that the first user takes the first action and the second user takes the second action, the processor is configured to cause the interface to transmit a first profile of the first user for display to the second user and cause the interface to transmit a second profile of the second user for display to the first user. The interface is configured to receive a first indication of a preference of the first user for the second profile of the second user; and receive a second indication of a preference of the second user for the first profile of the first user.

According to another embodiment, a method includes determining, by a processor, that a first user takes a first action and that a second user takes a second action. The method further includes, in response to determining that the first user takes the first action and the second user takes the second action, causing to transmit a first profile of the first user for display to the second user and causing to transmit a second profile of the second user for display to the first user. The method also includes receiving, by the interface, a first indication of a preference of the first user for the second profile of the second user and receiving, by the interface, a second indication of a preference of the second user for the first profile of the first user.

According to a further embodiment, at least one computer-readable medium comprising a plurality of instructions that, when executed by at least one processor, are configured to determine that a first user takes a first action and determine that a second user takes a second action. The plurality of instructions are further configured to, in response to determining that the first user takes the first action and the second user takes the second action, transmit a first profile of the first user for display to the second user and transmit a second profile of the second user for display to the first user. The plurality of instructors are further configured to receive a first indication of a preference of the first user for the second profile of the second user and receive a second indication of a preference of the second user for the first profile of the first user.

Certain embodiments provide one or more technical advantages. For example, an embodiment may allow users to simultaneously express indications of preference regarding each other, thereby decreasing the time required before users receive an indication that another user provides a positive preference indication, thus creating a more efficient environment for matches. As another example, an embodiment may transmit profiles to the front of a user's queue allowing for more immediate indication of preference, thereby decreasing the processing and bandwidth resources expended by users indicating preferences on users who have not yet viewed that user's profile or provided any indication of preference on that user. As a further example, an embodiment automatically generates suggestions for a user who is active on a network, of one or more other users who are also active on a network and with whom the user may wish to communicate. In this manner, certain embodiments reduce the processing and network bandwidth resources otherwise expended by the user when manually searching for online users with whom the user may wish to communicate. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
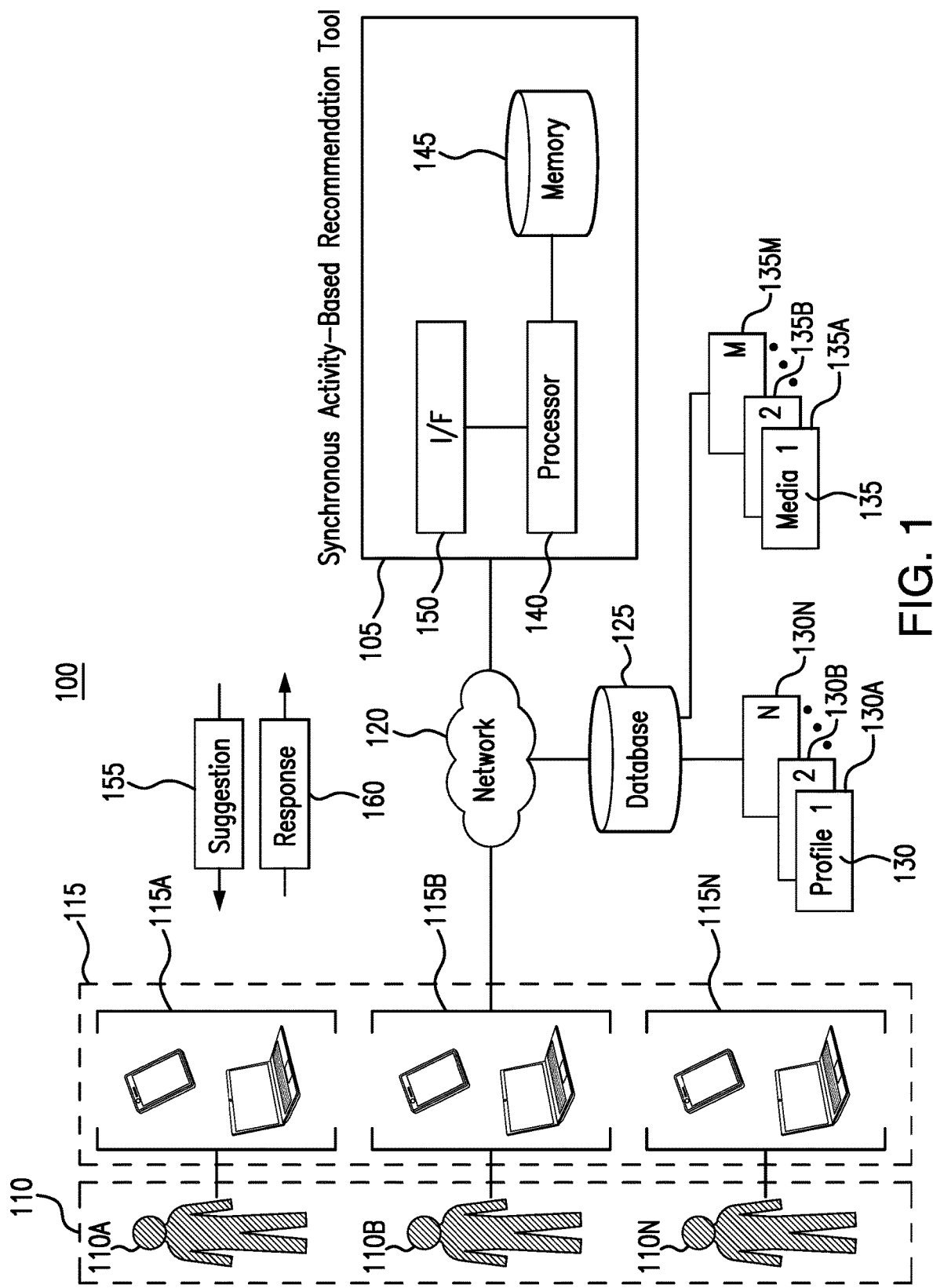
FIG. 1 illustrates an example system.
Figure 2:
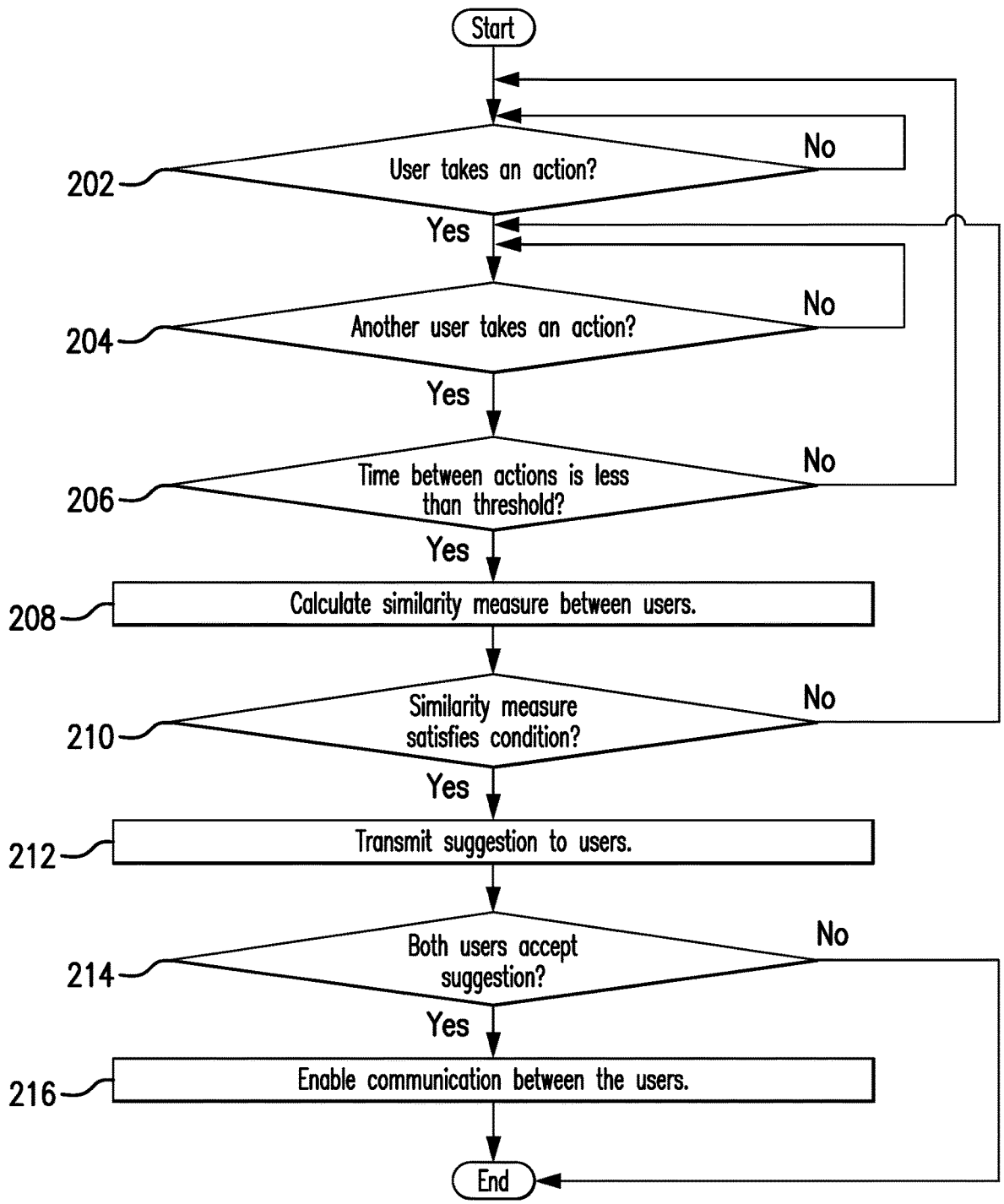
FIG. 2 presents a flowchart illustrating an example process by which the synchronous-activity-based recommendation tool of the system of FIG. 1 generates a suggestion of an activity in which two or more user who are active on a network may engage, and subsequently engages those users who accept the tool's suggestion in the activity.

Embodiments of the present disclosure and its advantages may be understood by referring to FIGS. 1 through 3 of the drawings, like numerals being used for like and corresponding parts of the various drawings.

Individuals are increasingly spending large portions of their free time engaging in various activities online. Such activities include, for example, streaming videos, listening to music, playing online games, accessing social-media pages, participating in online dating, browsing or posting to online message boards, participating in video chats, online shopping, and any other activity an individual may engage in while connected to the Internet. Often such individuals desire to participate in these activities with others. However, it may take significant time for an individual to identify a friend/connection who is willing/available to participate with him/her in an activity online.

As another example, when participating in a typical online-matching system, users may wish to both identify and communicate with potential matches during a single session with the system, rather than identifying potential matches during one session and then communicating with those potential matches during future sessions, potentially days later. As a specific example, in the online dating context, users may view profiles of other users that include particular sets of attributes related to those users, such as age, education, and interests, to identify those users with characteristics that they like. The system may then allow users to interact after each has expressed a positive indication of preference for the other. This connection process, however, may require a significant wait time because users are not necessarily viewing each other's profiles at the same time. For example, a first user may indicate a positive preference indication for a second user one day, and the second user may not even view the first user's profile until a few days later. Even if the second user indicates a positive preference for the first user as soon as the profile is viewed, there has been a delay for the first user. The second user may no longer be top of mind for the first user, and the first user may have less interest in connecting and engaging with the second user.

This disclosure contemplates a synchronous-activity-based recommendation tool that addresses one or more of the above issues. The tool may be incorporated into any system that enables users to communicate or otherwise engage with one another while using the system. Of the users who are currently using the system, the synchronous-activity-based recommendation tool selects users who may be compatible or may otherwise wish to interact with one another, and transmits suggestions associated with each user to the other, thereby allowing them to respond to the suggestions at or near the same time. If both users accept the suggestions, then the tool matches the users and allows them to connect and engage further. In this manner, the tool creates a concurrent experience and, in certain embodiments, enables immediate conversation.

As an example, when incorporated into a system that allows users to stream online videos, the tool may select those users who are currently using the system and who the tool has identified as likely having the same preferences for videos as one another (based, for example, on the users' viewing histories). The tool may then suggest to those users that they stream a video together. If both users indicate their acceptance of this suggestion, the tool may connect the users, enabling them to communicate with one another over the system and to simultaneously stream video content using the system.

As another example, when incorporated into an online matching system, the tool may select potentially compatible users who are currently using the system and transmit each user's profile to the other, allowing them to indicate a preference for one another's profile at or near the same time. If both users indicate a positive preference for the other, the tool matches them and allows them to connect and engage further. By providing users the opportunity to view each other's profile at or near the same time, there is a greater chance for the users to receive matches without a wait time and have the opportunity for more immediate conversations and connections.

FIG. 1 illustrates example system 100. As seen in FIG. 1, system 100 includes synchronous-activity-based recommendation tool 105, user(s) 110, device(s) 115, network 120, and database 125 containing profiles 130 of users 110. In certain embodiments, database 125 may also include media files 135. Generally, synchronous-activity-based recommendation tool 105 identifies users 110 who are active in system 100 (e.g., connected to network 120, taking actions in system 100, or otherwise available to engage in activities in system 100), and transmits to those active users 110 suggestions 155 of activities or interactions that they may wish to engage in, and which are associated with other users 110 who are also active in system 100. As an example, in certain embodiments, transmitting suggestions 155 to active users 110 includes transmitting profiles 130 of users 110 to one another (e.g., transmitting profile 130A of user 110A to user 110B and transmitting profile 130B of user 110B to user 110A), such that each may provide an indication of preference for the other. In this manner, synchronous activity-based recommendation tool 105 may receive indications of preferences of each user 110 for the other users and identify pairs of users who have expressed positive preference indications for each other while both users 110 are active in system 100, thereby enabling the tool to connect such pairs of users 110 with minimal delay.

As another example, in some embodiments, transmitting suggestions 155 to active users 110 includes transmitting suggestions of group activities to users 110. For instance, in response to determining that both user 110A and user 110B are active in system 100, synchronous-activity-based recommendation tool 105 may transmit, to both users, suggestion 155 to participate in an online activity together (e.g., playing an online game together, streaming an online video together, participating in a guided conversation together, or participating in any other online activity together). In some embodiments, synchronous-activity-based recommendation tool 105 may transmit to user 110A a suggestion 155 to join in an activity in which user 110B is already a participant (e.g., participating in a group chat that user 110B has already joined, attending a live virtual concert that user 110B is already attending, streaming a video that user 110B has already started streaming, or any other suitable online activity in which two or more users may participate and in which user 110B is currently participating). Synchronous-activity-based recommendation tool 105 then receives responses 160 from users 110 to suggestions 155, and connects those users 110 whose responses 160 indicate that they would like to engage in an online activity together. For example, in response to receiving responses 160 from users 110A and 110B indicating that both users would like to play an online game together, synchronous-activity-based recommendation tool 105 connects the users and engages them in the online game. Further details of the functions performed by synchronous-activity-based recommendation tool 105 are presented below, and in the discussion of FIGS. 2 through 4.

Devices 115 are used by users 110 to take actions in system 100. This disclosure contemplates that the actions taken by users 110 using devices 115 may be any suitable actions. For example, users 110 may use devices 115 to connect to network 120, transmit messages over network 120, access data over network 120, or any take any other suitable actions in system 100. Where network 120 is the Internet, users 110 may use devices 115 to access an Internet-connect mobile application, navigate to a webpage, access a social media account, or take any other suitable action while connected to the Internet. As a specific example, user 110A may use devices 110 to receive one or more profiles 130B through 130N of other users, provide indications of preference for those profiles, receive indications of connections made with one or more users (e.g., user 110B), for whom both user 110A had provided a positive indication of preference and from whom user 110A's profile 130A received a reciprocal positive preference indication, and communicate with connections.

Devices 115 may also be used by users 110 to receive suggestions 155 from synchronous-activity-based recommendation tool 105 and to transmit responses 160 back to the tool. As an example, in response to determining that user 110A is active in system 100, synchronous-activity-based recommendation tool 105 may transmit a suggestion 155 to device 115A of user 110A, suggesting that user 110A participate in an activity or interaction associated with user 110B, who is also active in system 100. For instance, suggestion 155 may correspond to a suggestion to stream a video with user 110B, a suggestion to play an online video with user 110B, a suggestion to participate in an online event with user 110B, a suggestion to participate in a guided conversion with user 110B, or a suggestion to engage in any other suitable activity with user 110B. In the online matching context—in which user 110A is provided with a queue of profiles 130 to view and provide indications of preference (positive, negative, or neutral) for—suggestion 155 may correspond to a prioritization of one or more profiles 130 within user 110A's queue of profiles. For instance, in response to determining that both user 110A and user 110B are active in system 100, synchronous-activity-based recommendation tool 105 may transmit suggestion 155 to device 115A of user 110A, which may be associated with an update of user 110A's queue of profiles that moves profile 130B of user 110B higher up in the queue (e.g., places profile 130B next in user 110A's profile queue), so that user 110A may view profile 130B sooner than otherwise. Synchronous-activity-based recommendation tool 105 may also transmit a similar suggestion 155 to device 115B of user 110B, by correspondingly updating user 110B's queue of profiles to move profile 130A of user 110A up in the queue (e.g., place profile 130A next in user 110B's profile queue). As another example in the online dating context, suggestion 155 may correspond to a suggestion to help user 110B engage in an online dating session (e.g., help user 110B to select from amongst profiles 130 that are presented to user 110B, provide opinions to user 110B about profiles 130 that are presented to user 110B, or engage in any other suitable way with user 110B while user 110B participates in an online dating session). Synchronous-activity-based recommendation tool 105 may generate such a suggestion 155 in response to determining that: (1) user 110A is in a relationship, while user 110B is single, (2) user 110A is more successful at online dating (e.g., has more successful matches) than user 110B, (3) user 110A has indicated that he/she is interesting in helping another user with their online dating activities, or (4) any other situation exists that may indicate that user 110A may wish to help user 110B engage in an online dating session, or that user 110B may wish to have user 110A help him/her engage in an online dating session.

Devices 115 may also be used by users 110 to transmit responses 160 to synchronous-activity-based recommendation tool 105, in response to receiving suggestions 155. A response 160 transmitted by device 115A may indicate whether user 110A accepts or rejects the suggestion 155 transmitted to device 115A. As an example, in response to receiving a suggestion 155 to participate in an activity/or interaction associated with user 110B, user 110A may use device 115A to transmit response 160 to synchronous-activity-based recommendation tool 105, indicating that user 110A wants to participate in the activity/interaction with user 110B, or that user 110A does not want to participate in the activity/interaction. As another example, in the online matching context, response 160 transmitted by device 115A of user 110A, may correspond to a preference indication for a profile 130 prioritized in user 110A's profile queue through suggestion 155.

In certain embodiments, transmitting a suggestion 155 (associated with one or more users 110) to device 115A of user 110A may correspond to automatically engaging user 110A in an online activity that involves the associated user(s). For example, suggestion 155 may correspond to automatically placing user 110A in a group chat, automatically pairing user 110A with one or more other users to engage in an online game/challenge together, automatically pairing user 110A with one or more users to engage in a guided conversation together, or automatically connecting user 110A to one or more other users is any other suitable manner. In such embodiments, transmitting response 160, which accepts or rejects suggestion 155, may take the form of a transmission from device 115A indicating that user 110A is actively participating in the online activity in which he/she was automatically engaged, or a transmission (or a lack thereof) from device 115A indicating that user 110A has exited the online activity in which he/she was automatically engaged.

Devices 115 include any appropriate device for communicating with components of system 100 over network 120. For example, device 115 may be or may be accompanied by a telephone, a mobile phone, a computer, a laptop, a wireless or cellular telephone, an electronic notebook, a personal digital assistant, a tablet, a server, an automated assistant, a virtual reality or augmented reality headset or sensor, or any other device capable of receiving, processing, storing, and communicating information with other components of system 100. Device 115 may also include a user interface, such as a display, a microphone, keypad, or other appropriate terminal equipment usable by user 110. In some embodiments, an application executed by device 115 may perform the functions described herein. In certain embodiments, devices 115 may communicate with synchronous-activity-based recommendation tool 105 through network 120 via a web interface. In some embodiments, an application executed by device 115 may perform the functions described herein.

Network 120 facilitates communication between and amongst the various components of system 100. This disclosure contemplates network 120 being any suitable network operable to facilitate communication between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication among the components.

Database 125 stores a set of user profiles 130. User profiles 130 define or represent features of users 110. Profiles 130 may be available to synchronous-activity-based recommendation tool 105, to the general public, to those that are members of an online matching system (e.g., an online dating system), a specific category of those members of an online matching system, or the user 110 to which the profile 130 corresponds. In certain embodiments, profiles 130 may include information stored in system 100 for use by synchronous-activity-based recommendation tool 105. In some such embodiments, certain information stored in profiles 130 may not be generally accessible to the corresponding user (e.g., user 110A may not be able to access certain information stored in his/her profile 130A). For example, in certain embodiments, synchronous-activity-based recommendation tool 105 may store detailed information associated with historical actions that users 110 have taken in system 100 in profiles 130.

Profiles 130 may contain any suitable information associated with users 110, and this information may be stored in profiles 130 in any suitable manner. As an example, in certain embodiments, profiles 130 include information that was solicited from users 110 when users 110 set up an account in system 100 (e.g., an online dating account, a video streaming account, a social media account, etc.) or was otherwise input by such users into their profiles. As another example, in some embodiments, profiles 130 may include information associated with the historical actions taken by users 110 in system 100. For instance, profiles 130 may include a record of the online videos streamed by users 110, the online games in which users 110 have participated, the other users 110 with whom users 110 have communicated, or any other suitable information related to activities taken by users 110 in system 100. As a further example, profiles 130 may include general information such as age, height, gender, and occupation, as well as detailed information that may include the users' interests, likes/dislikes, personal feelings, or outlooks on the world. In some embodiments, synchronous-activity-based recommendation tool 105 may review profiles 130 to determine suggestions 155. As an example, in the online matching context, synchronous-activity-based recommendation tool 105 may review profiles 130 to determine which users 110 should receive each other's profiles. For example, synchronous-activity-based recommendation tool 105 may review profile 130A and profile 130B to determine to send profile 130A to user 110B and to send profile 130B to user 110A, as suggestions 155, based on one or more features shared between profile 130A and profile 130B (e.g., similar likes/dislikes), one or more features of profile 130A and profile 130 that are indicative of potential compatibility between user 110A and user 110B (e.g., profile 130A includes features for which user 110B has indicated a preference, and vice versa), or any other information included in profiles 130. As another example, in the context of streaming online videos, synchronous-activity-based recommendation tool 105 may review profile 130A and profile 130B to determine to transmit a suggestion 155 to both user 110A and user 110B to watch a new online movie together, where profiles 130A and 130B indicate that both users have similar tastes in movies and have not yet viewed the new movie.

In certain embodiments, database 125 also stores media files 135. Media files 135 may correspond to any suitable media data. For example, media files 135 may correspond to video data, audio data, image data, text data, or any combination of the previous. In certain embodiments, media files 135 include videos that users 110 can stream using their devices 115. In some embodiments, media files 135 may be used by system 100 to generate an online experience that is displayed on the devices 115 of participating users 110. For example, media files 135 may be used to generate an online concert experience, an online choose-your-own-adventure experience, an online game, or any other suitable online experience. Synchronous-activity-based recommendation tool 105 may transmit one or more media files 135 to devices 115 in response to receiving responses 160 accepting suggestions 155 associated with such media. As an example, in response to transmitting a suggestion 155 to devices 115A and 115B, suggesting that user 110A and user 110B stream a particular video together, and receiving responses 160 back from devices 115A and 115B accepting suggestion 155, synchronous-activity-based recommendation tool 105 may transmit media data 135 corresponding to the suggested video to devices 115A and 115B, for simultaneous streaming of the video by users 110A and 110B. As another example, in response to transmitting a suggestion 155 to devices 115A and 115B, that user 110A and user 110B participate in an online experience together, and receiving responses 160 back from devices 115A and 115B accepting suggestion 155, synchronous-activity-based recommendation tool 105 may transmit video data 135 that is associated with the online experience to devices 115A and 115B. In certain embodiments, the video data that is sent to each device 115 may present a first-person view of the online experience from the perspective of the corresponding user 110, and may include a graphical representation of the other user(s) participating in the experience (e.g., video data 135A sent to device 115A may present a graphical representation of user 110B to user 110A, and video data 135B sent to device 115B may present a graphical representation of user 110A to user 110B). As a further example, in response to transmitting a suggestion 155 to devices 115A and 115B, that user 110A and user 110B participate in a guided conversation with one another, and receiving responses 160 back from devices 115A and 115B accepting suggestion 155, synchronous-activity-based recommendation tool 105 may transmit media data 135 in the form of one or more questions to devices 115A and 115B. These questions may be used to engage user 110A and user 110B in a guided conversation with one another. For example, media 135 may include a series of multiple choice, fill-in-the blank, or open-ended questions, to which user 110A and user 110B are asked to provide responses.

As seen in FIG. 1, synchronous-activity-based recommendation tool 105 includes processor 140, memory 145, and interface 150. This disclosure contemplates processor 140, memory 145, and interface 150 being configured to perform any of the functions of synchronous-activity-based recommendation tool 105 described herein. In general, synchronous-activity-based recommendation tool 105: (1) determines that two or more users 110 (e.g., 110A and 110B) are active in system 100, for example by determining that the users are taking action(s) in system 100; (2) in response to determining that such users 110 are active in system 100, transmits suggestions 155 to one or more of the active users 110 of activities or interactions associated with all or a subset of the other active users 110 in system 100 (e.g., transmits suggestion 155 to user 110A to participate in activity/interaction with user 110B, and transmits suggestion 155 to user 110B to participate in activity/interaction with user 110A); (3) receives responses 160 to suggestions 155, where responses 160 indicate whether or not the users 110 to which suggestions 155 were sent accept the suggestions (e.g., whether user 110A wants to engage in the suggested activity/interaction with user 110B, and whether user 110B wants to engage in the suggested activity/interaction with user 110A); (4) evaluates responses 160 to identify users 110 that wish to connect with one another through the suggested activity/interaction (e.g., determines that user 110A's response 160 indicates he/she wants to engage in the suggested activity/interaction with user 110B, and that user 110B's response 160 indicates he/she wants to engage in the suggested activity/interaction with user 110A); and (5) engages the identified users 110 in the suggested activity/interaction or enables communication between the identified users 110 (e.g., engage both user 110A and user 110B in the suggested activity/interaction, and enable user 110A and user 110B to communicate with one another through text or voice using their corresponding devices 115A and 115B). The manner by which synchronous-activity-based recommendation tool 105 performs these functions is described in further detail below, in the discussion of FIGS. 2 through 4.

Processor 140 may be any electronic circuitry, including, but not limited to microprocessors, application specific integrated circuits (ASIC), application specific instruction set processor (ASIP), or state machines, that communicatively couples to memory 145 and interface 150 and controls the operation of matching tool 105. Processor 140 may be 8-bit, 16-bit, 32-bit, 64-bit, or any other suitable architecture. Processor 140 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 140 may include other hardware and software that operates to control and process information. Processor 140 executes software stored on memory 145 to perform any of the functions described herein. Processor 140 controls the operation and administration of synchronous-activity-based recommendation tool 105 by processing information received from network 120, device(s) 115, interface 150, and memory 145. Processor 140 may be a programmable logic device, a microcontroller, a microprocessor, any suitable processing device, or any suitable combination of the preceding. Processor 140 is not limited to a single processing device and may encompass multiple processing devices.

Memory 145 may store, either permanently or temporarily, data, operational software, or other information for processor 140. Memory 145 may include any one or a combination of volatile and non-volatile local or remote devices suitable for storing information. For example, memory 145 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 145, a disk, a CD, or a flash drive. In particular embodiments, the software may include an application executable by processor 140 to perform one or more of the functions described herein.

Interface 150 represents any suitable device operable to receive information from network 120, transmit information through network 120, perform suitable processing of the information, communicate to other devices, or any combination of the preceding. As an example, interface 150 may transmit suggestions 155 to devices 115, and receive responses 160 to suggestions 155 from devices 115. As another example, interface 150 may transmit and receive profiles 130 for display to users 110. As another example, interface 150 may receive preference indications from devices 115 and provide these indications to processor 140, for evaluation. As a further example, interface 150 may transmit media files 135 to devices 115. Interface 150 represents any port or connection, real or virtual, including any suitable hardware or software, including protocol conversion and data processing capabilities, to communicate through a LAN, WAN, or other communication systems that allows matching tool 105 to exchange information with devices 115 and other components of system 100 via network 120.

Synchronous-activity-based recommendation tool 105 generates suggestions 155 for users 110 who are active in system 100. In some embodiments, synchronous-activity-based recommendation tool 105 monitors transmissions from devices 115 to determine when users 110 take actions in system 100. An action may be any indication that a user (e.g., user 110A) is active on a device (e.g., device 115A) within system 100 or is otherwise available to receive suggestions 155. As an example, in the online matching context, an action may include any indication that user 110A is available to view profiles of other users 110, which are provided as suggestions 155, and to provide indications of preference for such other users 110, through responses 160. As other examples of actions, user 110A may check messages from another user 110B, view profiles 130 of users 110 on device 115A, play a game, engage in a digital interaction, open an application related to synchronous-activity-based recommendation tool 105 on device 115A, or otherwise engage with or access system 100. If synchronous-activity-based recommendation tool 105 determines that a first user (e.g., 110A) is active or performs an action in system 100, it may continue and determine whether another user (e.g., 110B) is also active or has taken an action in system 100, in order to determine if other users 110 are available to connect with the first user.

Synchronous-activity-based recommendation tool 105 may determine that a user (e.g., user 110A) has taken an action in system 100 in any suitable manner, and such actions may correspond to any interactions between device 115 and one or more components of system 100. For example, in some embodiments, an action may be a request to system 100 by user 110A to receive suggestions 155 associated with other users 110 who are currently active in the system, or to be connected with users 110 who are currently active in the system (e.g., provided with the ability to transmit system-mediated communications to users 110 who are currently active in the system). As a specific example, in the online matching context, an action may correspond to a request from an active user 110A to receive profiles 130 of other users 110 who are also active in system 100, for evaluation by user 110A. As other examples, an action may correspond to a request submitted to system 100 from user 110A to: (1) watch a video 135 with another active user; (2) chat with one or more active users 110; (3) engage in an online experience (e.g., an online concert, an online game, a group chat, an online choose-your-own adventure, etc.) with other active users 110; or (4) any other suitable request to engage with other active users 110. In such examples, user 110A may (1) select a "start now" button; (2) select a request to engage with users who are active or online now; (3) opt-in to synchronous activity generally; or (4) perform any other suitable action to indicate that the user is interesting in participating in activities/interactions with other users who are also active in system 100. In certain embodiments, an action may correspond to user 110 registering with system 100 (e.g., a first action a user 110 may take in system 100). For example, user 110 may have to register by creating a profile, downloading an application to device 115, signing on to a web site, configuring a setting to engage in synchronous activity, or any other sign-up procedure. After a user 110 has registered with system 100, synchronous-activity-based recommendation tool 105 may subsequently determine that the user has taken an action by: (1) determining that the user's device 115 is connected to network 120; (2) determining that the user's device 115 has transmitted data over network 120; (3) determining that the user has opened an application associated with system 100 on his/her device 115; (4) determining that the user has accessed a webpage using device 115; or (5) determining that the user has performed any other suitable action using device 115.

Synchronous-activity-based recommendation tool 105 transmits suggestions 155 to users 110 in response to determining that two or more users 110 are active in system 100 or have recently taken actions in system 100. As an example, if a first user 110A joins a group chat, synchronous-activity-based recommendation tool 105 may transmit a suggestion 155 to user 110B to join the same group chat, in response to determining that second user 110B is active in system 100. As another example, in the context of an online matching system, if a first user 110A begins viewing user profiles (e.g., the action taken by user 110A is viewing the profile 130N of user 110N), synchronous-activity-based recommendation tool 105 may wait until a second user 110B also starts viewing profiles (e.g., the action taken by user 110B is viewing the profile 130M of user 110M) to transmit suggestions 155 to users 110A and 110B. In particular, in response to determining that both user 110A and user 110B are actively viewing profiles, synchronous-activity-based recommendation tool 105 may transmit profile 130A to user 110B and profile 130B to user 110A, thereby allowing users 110A and 110B to evaluate the profiles of one another while both users are active in the system.

In some embodiments, synchronous-activity-based recommendation tool 105 determines that a time period between a first action taken by a first user and a second action taken by a second user is less than a threshold. If users 110 both perform actions within a certain period of time, it indicates they may both be active in system 100 and available to receive suggestions 155 of activities/interactions they may engage in with other users 110 who are also currently active in the system. For example, in the context of an online matching system, if user 110A accesses the system and checks its messages at a first time, and then one minute later, user 110B views profiles 130 of users 110, synchronous-activity-based recommendation tool 105 may determine that the time period is less than a threshold. The threshold may be any amount of time, including, for example, a few seconds, a few minutes, a few hours, or even a few days. The threshold may depend on a user's average time of engagement with system 100 (e.g., once a day, once every few hours). If the time period between the users' actions is less than a threshold, then synchronous-activity-based recommendation tool 105 may transmit suggestions 155 for display to user 110, described further below.

Suggestions 155 may take any suitable form. For example, in certain embodiments, transmitting a suggestion 155 that is associated with user 110B, to user 110A, may correspond to transmitting a profile 130B of user 110B to user 110A, for evaluation by user 110A. In some embodiments, transmitting a suggestion 155 that is associated with user 110B, to user 110A, may correspond to transmitting an invitation to user 110A to join in an online activity in which user 110B is already a participant, or for which the tool also sends/has sent user 110B an invitation. In some embodiments, a suggestion 155 transmitted to user 110A is associated with only one other active user (e.g., user 110B). In certain embodiments, a suggestion 155 transmitted to user 110A may be associated with multiple other active users (e.g., multiple of users 110B through 110N). For example, a suggestion 155 transmitted to user 110A may correspond to a suggestion to join an online group with other active users 110 who are similar to user 110A (as determined by synchronous-activity-based recommendation tool 105). Such groups may be user-specific. For example, in response to users 110A through 110C all indicating through responses 160 that they would like to connect with other online users, synchronous-activity-based recommendation tool 105 may generate a first group that is associated with user 110A and includes users 110A and 110B, a second group that is associated with user 110B, and includes users 110A, 110B, and 110C, and a third group that is associated with user 110C and includes users 110B and 110C, wherein synchronous-activity-based recommendation tool 105 has determined (based on one or more similarity metrics) that users 110A and 110B are similar, and that users 110B and 110C are similar, but that users 110A and 110C are not similar. Synchronous-activity-based recommendation tool 105 may add additional users 110 to these groups, as the users become available. For example, in response to determining that user 110D is newly active in system 100, the tool may transmit a suggestion 155 to user 110D, that the user connect with other active users, and receive a response 160 from user 110D accepting suggestion 155. Synchronous-activity-based recommendation tool 105 may then determine to which of the active users 110 user 110D is similar, and add user 110D to their associated groups. For instance, in response to determining that user 110D is similar to user 110A (and not similar to users 110B or 110C), synchronous-activity-based recommendation tool 105 may generate a fourth group that is associated with user 110D and includes users 110D and 110A, as well as add user 110D to user 110A's group of active connections. Similarly, synchronous-activity-based recommendation tool 105 may remove users 110 from any of the groups in which are included, in response to determining that the users are no longer active in system 100 (e.g., a user has not taken any actions in system 100 within a given time period). Synchronous-activity-based recommendation tool 105 may also remove an active user 110D from the group of another active user 110A, in response to receiving an indication of negative preference for user 110D from user 110A.

As mentioned above, in certain embodiments (for example embodiments in which system 100 is an online matching system), the suggestions 155 transmitted by synchronous-activity-based recommendation tool 105 may take the form of profiles 130 transmitted to devices 115, for display to users 110, who may then provide indications of preference for the profiles, as responses 160. Transmitting a profile 130 to a device 115, may involve synchronous-activity-based recommendation tool 105 placing the profile next in the line or queue of profiles for a user to view, at the end of the queue, at some other specified position (e.g., after a number of other profiles 130), or in a random spot. For example, after synchronous-activity-based recommendation tool 105 determines that user 110A and 110B both took an action in system 100, it may transmit the profile of the other to the end of the other user's queue of profiles 130. As another example, synchronous-activity-based recommendation tool 105 may place profiles 130 of those users earlier in the queue (e.g., skipping in front of other profiles 130) given the recent action taken by users 110A and 110B). In order for user 110 to indicate an indication of preference (e.g., positive preference, negative preference, pass) for another user 110, synchronous-activity-based recommendation tool 105 provides profile 130 of the user 110. For example, user 110A may receive the profiles 130B and 130C of users 110B and 110C, respectively. Device 115 may display all or a portion of profiles 130 to user 110.

In some embodiments in which transmitting suggestions 155 includes transmitting profiles 130, synchronous-activity-based recommendation tool 105 transmits a queue of plurality of profiles 130 of users 110 to the first user. The queue may comprise any number of profiles 130 in the queue, such as a first queued profile (e.g., currently viewable profile), a second queued profile (e.g., profile that appears to user 110 next after the first queued profile), a third queued profile (e.g., profile that appears to user 110 after the second queued profile), and any number of queued profiles. In some embodiments, the queue may represent the order in which user 110 may view profiles 130. Synchronous-activity-based recommendation tool 105 may send profiles 130 in queues that are sequentially placed after the other, which may provide a consistent number of profiles 130 for user 110 to view. In some embodiments, synchronous-activity-based recommendation tool 105 transmits profile 130 of user 110 to the queue for specific placement. Synchronous activity-based recommendation tool 105 may place profile 130 at any place in the queue of profiles 130. In some embodiments, synchronous-activity-based recommendation tool 105 may place profile 130 after the first queued profile and before the second queued profile. This would allow profile 130 to be the next profile seen by user 110. For example, if user 110A takes an action within a certain amount of time of user 110B, synchronous-activity-based recommendation tool 105 may transmit profile 130A of user 110A to user 110B, placing profile 130A immediately behind the first queued profile (i.e., profile 130 that is currently visible by user 110B). In some embodiments, synchronous-activity-based recommendation tool 105 displays profile 130 in response to receiving an indication of preference for the first queued profile. Synchronous activity-based recommendation tool 105 keeps the display of the first queued profile until user 110 provides an indication of preference, and only then displays profile 130. Continuing the example from above, after user 110B provides an indication of preference on the first queued profile, profile 130A of user 110A is the next profile that user 110B sees and provides an indication of preference.

In some embodiments, synchronous-activity-based recommendation tool 105 displays a status of user 110. A status may provide information about what the user is doing (e.g., whether the user is typing, viewing profiles, etc.), whether the user is active, or when the user was most recently active. For example, user 110A may receive a status of user 110B, indicating that user 110B is "online now," "active now," "currently available," or indicating when user 110 was last active (e.g., last active 5 minutes ago). By viewing the status of another user, user 110 (e.g., user 110A) may be more inclined to accept a suggestion 155 associated with that user (e.g., accept a suggestion 155 to chat with the user, indicate a positive preference indication for a profile 130 of the user, etc.), given that user 110B is online now or was recently online. As another example, synchronous-activity-based recommendation tool 105 may display that user 110A is considering a suggestion 155 associated with another user 110B (e.g., considering whether to participate in a group chat to which the other user was also invited, viewing the profile 130B of the other user 110B, etc.), or currently engaged in the activity associated with suggestion 155 (e.g. currently participating in an online concert experience or other activity/experience that was presented to user 110B as suggestion 155, currently typing a message in a group chat that was presented to user 110B as suggestion 155, etc.). For example, suggestion 155 may appear on device 115A for user 110A, and synchronous-activity-based recommendation tool 105 may indicate to user 110A that user 110B is viewing a corresponding suggestion 155, or is already participating in the activity associated with suggestion 155. Knowing this, user 110A may be more inclined to accept suggestion 155 in order to connect with user 110B and engage further with that user. For example, in the online matching context, a user 110A may be more willing to provide a positive preference indication for the profile of another user (e.g., profile 130B of user 110B), if user 110A knows that user 110B is viewing his/her profile (e.g., profile 130A of user 110A) at the same time, and thus will likely be readily available for communication, if both users provide positive preference indications for one another.

In some embodiments, synchronous-activity-based recommendation tool 105 receives from user 110A an indication of preference for one or more users 110B who are associated with suggestions 155. The indication of preference may include a positive preference indication, a negative preference indication, a pass indication, or no indication at all. A user 110A may provide a preference indication for another user 110B when (1) user 110A is presented with a suggestion 155 that is associated with user 110B, (2) after user 110A has participated in an activity/interaction with user 110B, or (3) at any other suitable time. A user 110A may communicate a preference indication for another user 110B to synchronous-activity-based recommendation tool 105 by selecting one or more buttons associated with user 110B and displayed to user 110A on a graphical user interface displayed on his/her device 115A (e.g., by selecting a LIKE button, a NOPE button, a PASS button, etc.), or in any other suitable manner. Synchronous-activity-based recommendation tool may use the indications of preference it receives from users 110 in any suitable manner. As an example, in certain embodiments, synchronous-activity-based recommendation tool 105 may use the indications of preference that it receives from a user 110A to tailor the suggestions 155 that it transmits to user 110A in the future. For example, if user 110A provides a negative preference indication for user 110B, synchronous-activity-based recommendation tool 105 may decline to provide user 110A with suggestions 155 that are associated with user 110B in the future. As another example, in certain embodiments, synchronous-activity-based recommendation tool 105 may use the preference indications provided by a user 110A as responses 160 received from the user. For example, if user 110A provides a positive preference indication for another user 110B, in response to receiving a suggestion 155 that is associated with user 110B, synchronous-activity-based recommendation tool 105 may connect users 110A and 110B and enable them to engage in an activity with one another. For instance, synchronous-activity-based recommendation tool 105 may transmit profiles 130 of users 110 to a user (e.g., user 110), as suggestions 155, for the user to indicate a preference indication for the users 110 (e.g., user 110B). In this example, if user 110A provides a positive preference indication for user 110B and user 110B provides a positive preference indication for user 110A, then synchronous-activity-based recommendation tool 105 determines that there is a match between user 110A and user 110B. Synchronous activity-based recommendation tool 105 may then provide an opportunity for users 110A and 110B to interact further, such as viewing additional information on profiles 130, sending messages, sending videos, engaging in a live chat, or any other form of interaction or engagement. On the other hand, if user 110A selects a negative preference indication for user 110B, synchronous-activity-based recommendation tool 105 may prevent users 110A and 110B from interaction or prevent user 110B from viewing profile 130A of user 110A. In some embodiments, user 110 might not select any preference indication (e.g., turns off application on device 115, selects "skip" or "cancel"). If user 110A does not select either a positive or negative preference indication, synchronous-activity-based recommendation tool 105 may keep profile 130 at the top of the queue of user 110. For instance, if user 110A does not select LIKE or NOPE, synchronous-activity-based recommendation tool 105 may keep profile 130B of user 110B at the top of the queue of user 110A until an indication of preference is made.

In some embodiments, synchronous-activity-based recommendation tool 105 transmits a notification to user 110A, based on the response of user 110B to a suggestion 155 that is associated with user 110A. The notification may include information about the response, whether the response received from user 110B is the same as the response 160 provided by user 110A to a corresponding suggestion 155 that was associated with user 110B and transmitted to user 110A, or any other suitable information. The notification may be a push notification, an indication on an interface, a message, an alert, or any type of act of notifying a user. For example, if both users 110A and 110B accept suggestions 155 associated with one another, synchronous-activity-based recommendation tool 105 may transmit a notification to each of them that the other user indicated a willingness to participate in an activity/interaction with them. In this example, the notification may also provide an opportunity for the users to engage with each other (e.g., "chat now" or "go to match queue").

In certain embodiments, two or more users 110 must both accept suggestions 155 in order for synchronous-activity-based recommendation tool 105 to engage the users in an activity together. For example, in response to transmitting a suggestion 155 to users 110A and 110B to watch a movie together, if both users 110A and 110B transmit responses 160 to synchronous-activity-based recommendation tool 105 accepting the suggestion, the tool may (1) connect the users (e.g., enable the users to communicate with one another either through video, voice messages, or text messages), and (2) transmit media 135 to devices 115A and 115B, thereby enabling both users to simultaneously stream the movie. Similarly, in response to transmitting a suggestion 155 to users 110A and 110B that user 110A help user 110B engage in an online dating session, if both users 110A and 110B transmit responses 160 to synchronous-activity-based recommendation tool 105 accepting the suggestion, the tool may (1) connect the users (e.g., enable the users to communicate with one another either through video, voice messages, or text messages), and (2) enable user 110B to view information or engage in activities that he/she may use to help user 110A engage in the online dating session (e.g., view the profiles 130 that are presented to user 110A during the online dating session, view the actions that user 110A is taking while participating in the online dating session, perform actions on behalf of user 110A in the online dating session, etc.). On the other hand, if one or both of users 110A and 110B transmit a response 160 rejecting suggestion 155, synchronous-activity-based recommendation tool 105 will not connect the users. In some embodiments, only one user 110 must accept suggestion 155 in order for synchronous-activity-based recommendation tool 105 to engage the user in an activity with other online users. This may occur when, for example, suggestion 155 corresponds to a suggestion to participate in an activity already in progress (e.g., attend an online concert, participate in a group chat, etc.).

Synchronous-activity-based recommendation tool 105 may transmit suggestions 155 to all active users 110, or only a subset of active users 110. For example, in certain embodiments, synchronous-activity-based recommendation tool 105 may transmit suggestions 155 only to those users 110 who have indicated a desire to participate in synchronous activities/interactions with other users 110. In some embodiments, synchronous-activity-based recommendation tool 105 identifies a subset of active users 110, to whom the system sends suggestions 155 to engage in synchronous activities/interactions with other active users 110, based on any of a variety of factors, including, but not limited to, the information included in profiles 130, preferences of users 110, locations of users 110, or randomly. For example, synchronous-activity-based recommendation tool 105 may identify a pair of users 110A and 110B to which to transmit a suggestion 155 to participate in an online activity together or otherwise interact with one another randomly, based on the timeframe over which both took action in system 100.

As another example, in some embodiments, synchronous-activity-based recommendation tool 105 may identify two or more users 110A and 110B to which to transmit suggestions 155 to participate in an online activity/interaction with one another, based at least in part on information included in one or more of the profiles 130A and 130B of the users. As discussed above, profiles 130 may contain any and all information about users 110, such as age, gender, location, preferences in other users, answers to presented questions, rating information, match history, interests, hobbies, favorite types of interactions, records held for particular games, historical information about the activities the users performed in system 100, or any other suitable information about the users. In certain embodiments, synchronous-activity-based recommendation tool 105 may analyze profiles 130 of users 110 to determine to which active users 110 to transmit suggestions 155. For example, if users 110A and 110B went to the same school, synchronous-activity-based recommendation tool 105 may transmit a suggestion 155 to each user, to participate in an activity/interaction with one another (e.g., a suggestion that both users participate in an online game together). As another example, in embodiments in which users 110 may provide ratings of other users (e.g., a user 110A may provide a rating for a user 110B, based on user 110A's preference for user 110B's profile, based on user 110A's experience participating in an online activity with user 110B, or based on any other suitable information about user 110B), synchronous-activity-based recommendation tool 105 may send a new user 110A a suggested activity/interaction associated with a highly-rated user 110B, in order to provide new user 110A with the ability to interact with quality users 110. As a further example, in some embodiments, synchronous-activity-based recommendation tool 105 may transmit suggestions 155 to users 110 based on location. For example, synchronous-activity-based recommendation tool 105 may transmit suggestions 155 to users 110A and 110B, to participate in an activity or otherwise interact with one another, because the users are near each other, have been near each other before, both visit the same or similar locations (e.g., love coffee shops), one user 110A is in a location that interests user 110B (e.g., user 110A lives in France and user 110B is interested in France), both are in or at a college, both are in the same country, or both are in different countries.

In some embodiments, synchronous-activity-based recommendation tool 105 may use the information included in profiles 130 to evaluate similarity measures between active users 110, in order to assess whether certain users 110 are compatible with one another or whether they are likely to enjoy the same online activities as one another. As an example, in response to determining that three users—user 110A, user 110B, and user 110N—are active in system 100, synchronous-activity-based recommendation tool 105 may determine a first similarity score between user 110A and user 110B, a second similarity score between user 110A and user 110N, and a third similarity score between user 110B and user 110N. Synchronous-activity-based recommendation tool 105 may then transit suggestions 155 to two or more of the users, based on the calculated similarity scores. For example, in response to determining that the first similarity score between user 110A and user 110B is greater than a threshold, the tool may transmit (1) a suggestion 155 to user 110A, which is associated with user 110B, and (2) a suggestion 155 to user 110B, which is associated with user 110A. On the other hand, in response to determining that the second similarity score between user 110A and user 110N is less than the threshold, and that the third similarity score between user 110B and user 110N is less than the threshold, synchronous-activity-based recommendation tool 105 may refrain from transmitting suggestions 155 to user 110N that are associated with either user 110A or user 110B.

The similarity measure(s) evaluated by synchronous-activity-based recommendation tool 105 may include any suitable measure of the similarity between a pair of users 110A and 110B, or the potential compatibility between the users, and may be evaluated by synchronous-activity-based recommendation tool 105 in any suitable manner. As an example, a similarity measure between a pair of users 110A and 110B may provide a measure of the number of features/traits shared between the users, as determined from the information included in the profiles 130A and 130B of the users. As a specific example, in the context of an online video streaming system 100, a large similarity score between users 110A and 110B may indicate that both users have viewed a large number of the same videos (thereby indicating that the users likely have similar tastes in videos), while a small similarity score between users 110A and 110C may indicate that user 110A has not viewed many of the videos viewed by user 110C, and vice versa (thereby indicating that the users likely do not have similar tastes in videos). As another example, a similarity measure between users 110A and 110B may correspond to a predicted compatibility between the users as determined by a machine learning algorithm trained to predict user compatibility. For instance, such a machine learning algorithm may predict that user 110A is likely compatible with user 110B, by (1) determining that user 110A's profile is similar to the profiles of a first subset of users 110; (2) determining that user 110B's profile is similar to the profiles of a second subset of users 110; and (3) determining that users of the first subset tend to approve of users of the second subset, and vice versa, where approval may take the form of positive preference indications for the profiles of the users, exchange of multiple online communications between the users, participation by the users in multiple activities together, or any other suitable information that may indicate that the users liked/approved of one another.

Modifications, additions, or omissions may be made to the systems described herein without departing from the scope of the invention. For example, system 100 may include any number of users 110, devices 115, networks 120, and databases 125. The components may be integrated or separated. Moreover, the operations described above may be performed by more, fewer, or other components. For example, although described as synchronous-activity-based recommendation tool 105 performing certain operations, any component in system 100 may perform these operations. Additionally, the operations may be performed using any suitable logic comprising software, hardware, or other logic. As used in this document, "each" refers to each member of a set or each member of a subset of a set.

FIG. 2 presents a flowchart (described in conjunction with elements of FIG. 1) illustrating an example method 200 by which synchronous-activity-based recommendation tool 105 suggests activities/interactions 155 for two or more users 110, who are active in system 100, to engage in with one another. In step 202, synchronous-activity-based recommendation tool 105 determines whether a first user 110A takes an action in system 100. If in step 202 the tool determines that first user 110A took an action in system 100, in step 204 synchronous-activity-based recommendation tool 105 determines whether a second user 110B takes an action in system 100. If in step 204 the tool determines that second user 110B also took an action in system 100, in step 206 synchronous-activity-based recommendation tool 105 determines whether the time interval between the action taken by first user 110A and the action taken by second user 110B is less than a threshold.

If in step 206 the tool determines that the time interval between the action taken by first user 110A and the action taken by second user 110B is less than the threshold, in step 208 synchronous-activity-based recommendation tool 105 calculates a similarity measure between first user 110A and second user 110B. As an example, the tool may determine a similarity or compatibility score between first user 110A and second user 110B, based on information included in the profiles 130A and 130B of the users. As another example, the tool may determine the number of features (e.g., age, location, school, interests, etc.) that the users have in common. In step 210 synchronous-activity-based recommendation tool 105 determines whether the similarity measure satisfies a condition. For example, the tool may determine (1) whether a calculated similarity score is greater than a threshold, (2) whether the profiles 130A and 130B of the users share at least a minimum number of features, or (3) any other suitable condition. If in step 210 synchronous-activity-based recommendation tool 105 determines that the similarity measure calculated between the users satisfies the condition, in step 212 the tool transmits suggestions 155 to users 110A and 110B. The suggestion 155 transmitted to user 110A is associated with user 110B, and the suggestion 155 transmitted to user 110B is associated with user 110A. For example, suggestions 155 may correspond to a suggestion to the two users to stream a video together, chat with one another, play an online game together, participate in a guided conversation together, participate in an online dating session together (e.g., a first user helps a second user perform actions in an online dating session), or engage in any other suitable activity together. In some embodiments, the suggestion 155 transmitted to user 110A includes the profile 130B of user 110B, and the suggestion 155 transmitted to user 110B includes the profiles 130A of user 110A. Further details of such embodiments are provided below in the discussion of FIGS. 3A through 4.

In step 214 synchronous-activity-based recommendation tool 105 receives responses 160 back from users 110A and 110B and determines whether or not both users have accepted suggestions 155. If in step 214 the tool determines that both users have accepted suggestions 155, in step 216 synchronous-activity-based recommendation tool 105 engages the users in the suggested activity together. For example, where the suggested activity corresponded to streaming a video together, the tool simultaneously transmits media files 135 that are associated with the video to the devices 115A and 115B of users 110A and 110B, and enables communication between the users.

Modifications, additions, or omissions may be made to method 200 described herein without departing from the scope of the invention. For example, the steps may be combined, modified, or deleted where appropriate, and additional steps may be added. In an embodiment where synchronous-activity-based recommendation tool 105 transmits a suggestion 155 to a user 110A to join in an activity currently in progress (e.g., an online concert experience, an online group chat, etc.), steps 204 and 206 may be omitted from method 200. Additionally, the steps may be performed in any suitable order without departing from the scope of the present disclosure. While discussed as synchronous-activity-based recommendation tool 105 performing the steps, any suitable component of system 100 may perform one or more steps of method 200.

Figure 3A:
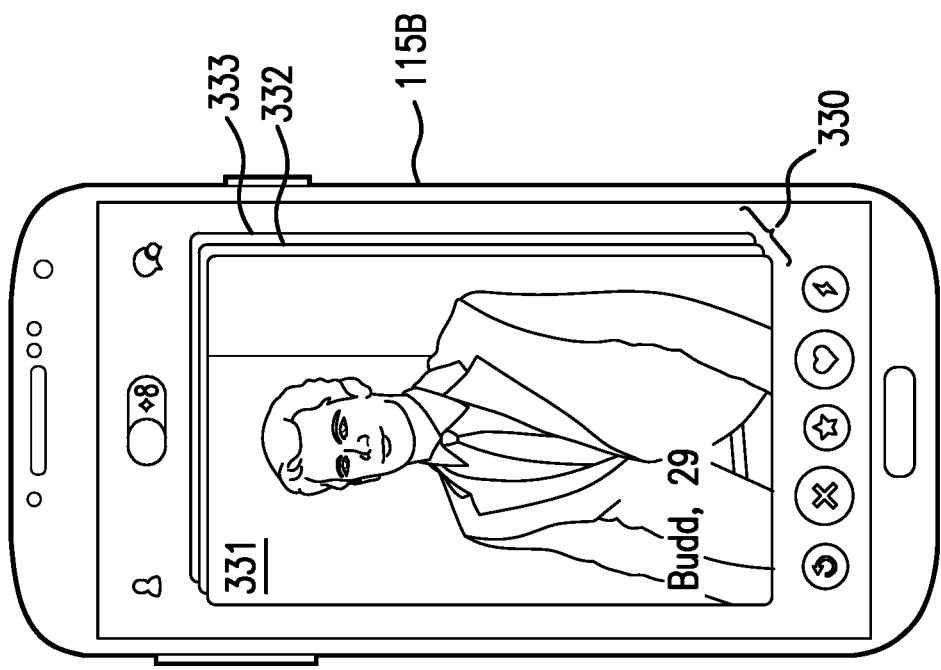
FIGS. 3A and 3B illustrate an example of a graphical user interface generated by synchronous-activity-based recommendation tool of the system of FIG. 1, for use in an online-matching system.
Figure 3A:
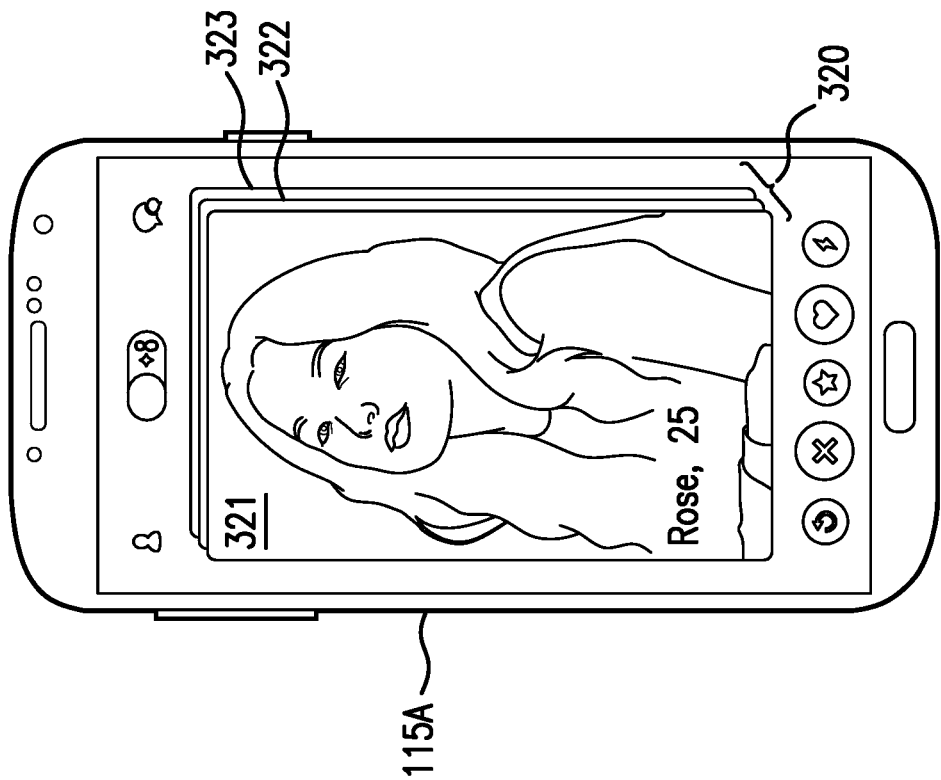
Figure 3B:
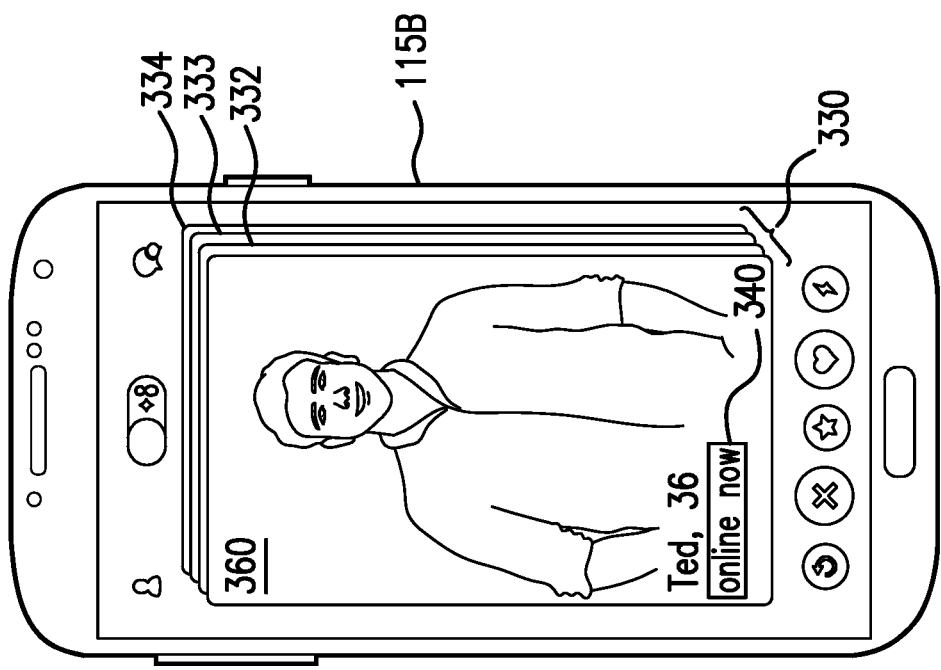
Figure 3B:
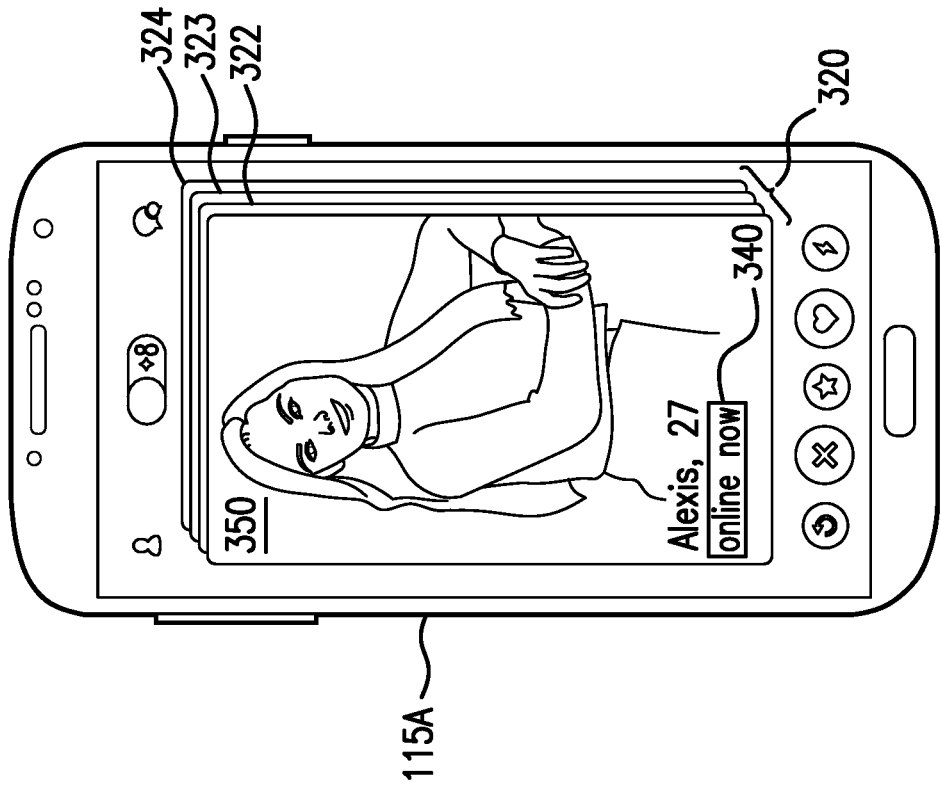
Figure 4:
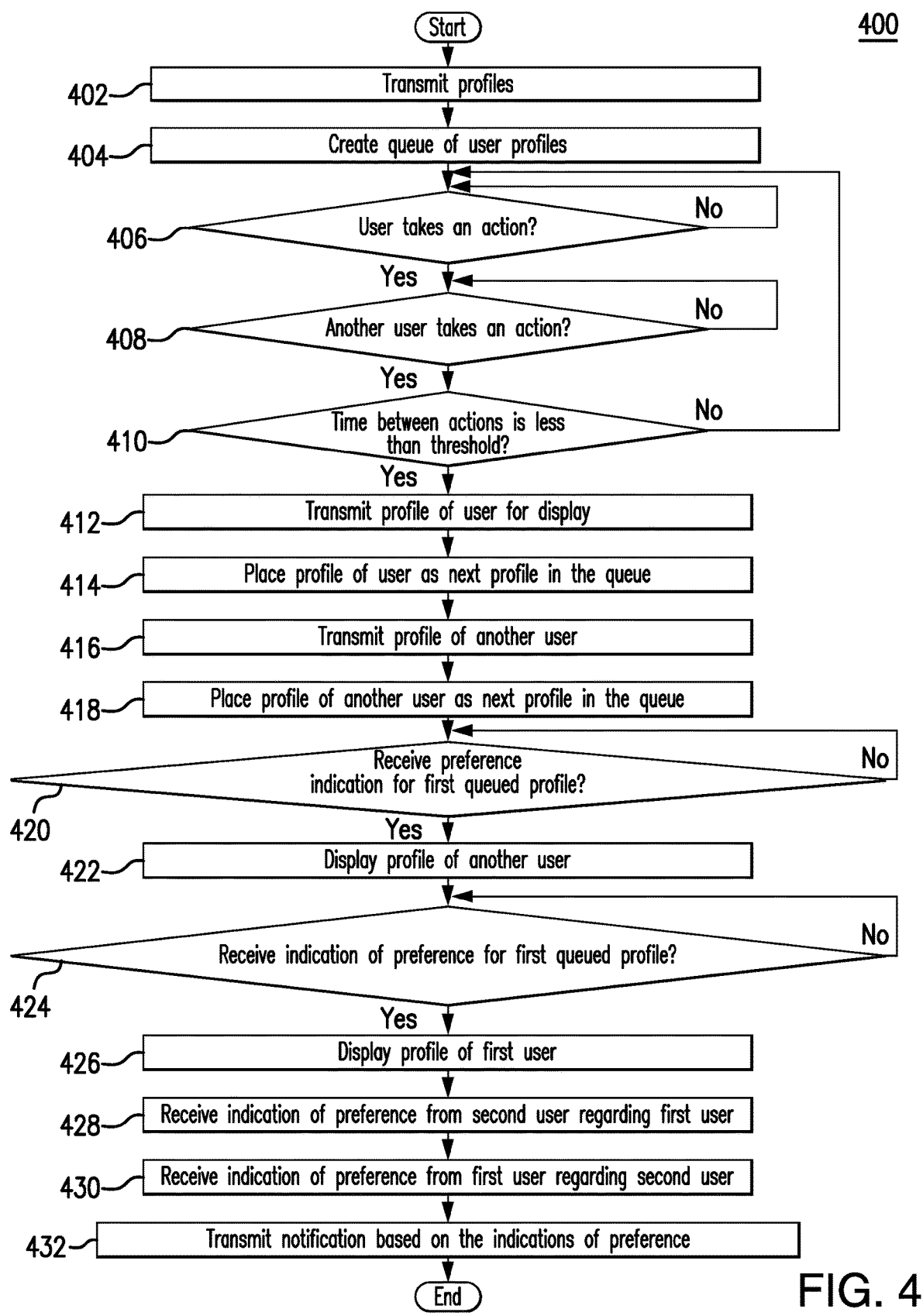
FIG. 4 presents a flowchart illustrating an example process by which the synchronous-activity-based recommendation tool of the system of FIG. 1 suggests users who are currently active on an online-matching system to one another.

FIGS. 3A, 3B, and 4 provide further details of an embodiment of synchronous-activity-based recommendation tool 105 in which the suggestions 155 that the tool transmits to users 110 take the form of profiles 130 presented to the users 110, and the responses 160 provided by the users 110 to suggestions 155 take the form of indications of preference for the transmitted profiles 130.

FIGS. 3A and 3B illustrate an example of a graphical user interface on devices 115A and 115B generated by synchronous-activity-based recommendation tool 105 of system 100 of FIG. 1, in an embodiment in which the suggestions 155 transmitted by the tool correspond to profiles 130. In particular, FIGS. 3A and 3B provide an example of how synchronous-activity-based recommendation tool 105 may transmit and display profiles or queues of profiles to users 110 through devices 115. As an example, device 115A may be viewed by user 110A (e.g., Ted) and device 115B may be viewed by user 110B (e.g., Alexis).

FIG. 3A illustrates an example of device 115A displaying queue of profiles 320, including individual profiles 321, 322, and 323 (e.g., profiles 130 of FIG. 1). In this example, profile 321 on user device 115A shows a user named Rose, listed as 25 years old. User 110A (e.g., Ted) viewing device 115A may indicate a preference for Rose by selecting a positive preference indication, a negative preference indication, or a pass on profile 321. After indicating a preference on profile 321, the next profile will appear on the display, such as profile 322. After user 110A (e.g., Ted) indicates a preference indication on user profile 322, profile 323 will appear. Similarly, user device 115B may be viewed by user 110B (e.g., Alexis). Device 115B displays queue of profiles 330 with individual profiles 331, 332, and 333. In this example, profile 331 on user device 115B shows Budd, listed as age 29. After user 110B (e.g., Alexis) indicates a preference for profile 331 (e.g., Budd), the next profile 332 will appear. Similarly, when user 110B indicates a preference on profile 332, the next profile, such as profile 333, will appear.

FIG. 3B illustrates an example of synchronous-activity-based recommendation tool 105 placing profiles earlier in the queue. For example, synchronous-activity-based recommendation tool 105 may determine that both users 110A and 110B (e.g., Alexis and Ted) have taken actions within a certain amount of time with each other. In response to this determination, synchronous-activity-based recommendation tool 105 may transmit Ted's profile (e.g., profile 360) to Alexis and Alexis' profile (e.g., profile 350) to Ted. In some embodiments, synchronous-activity-based recommendation tool 105 may add profiles to the end of queues 320 and 330. In certain embodiments, synchronous-activity-based recommendation tool 105 may add profiles to the next profile in queue 320 or 330. For example, after user 110A (e.g., Ted) views profile 321 in FIG. 3A, typically he would see profile 322 next. However, synchronous-activity-based recommendation tool 105 may insert profile 350 ahead of profile 322 given that Alexis (e.g., user 115B) recently took an action within system 100. In this example, device 115A illustrates profile 350 of Alexis ahead of profile 322. In some embodiments, synchronous-activity-based recommendation tool 105 may place profile 350 as the next profile in queue 320 before user 110A provides a preference on profile 321, so that user 110A does not see that queue 320 has been altered. Similarly, synchronous-activity-based recommendation tool 105 may place profile 360 of Ted ahead of profile 332 such that user 110B (e.g., Alexis) sees Ted's profile next. In this example, both Alexis (e.g., user 110B on device 115B) and Ted (e.g., user 110A on device 115A) may see each other's profiles (e.g., profile 350 and profile 360) at the same time. By viewing profiles of each other, it may shorten the timeframe for a receiving a positive preference indication by both of them and thus increase the likelihood that the two users may match sooner and engage in further interactions. In some embodiments, the interface may include indication 340 that another user is available or online now. Indication 340 may appear on a profile of a user, be a push notification, a background message, or any type of indication. Continuing the example from above, when Ted (user 110A) sees profile 350 of Alexis, he can see that she is "online now" from indication 340. Similarly, Alexis (user 110B) may see profile 360 of Ted and can see he is "online now" from indication 340. By seeing that the other is online, it may increase the likelihood that the users provide an indication of preference soon, thus increasing the likelihood of quicker time period of matching, if both provide positive preference indications.

FIG. 4 presents a flowchart illustrating method 400 for synchronous-activity-based recommendation tool 105 of system 100 of FIG. 1. Method 400 begins at step 402 where synchronous-activity-based recommendation tool 105 transmits user profiles, such as profiles 130 of FIG. 1. Synchronous activity-based recommendation tool 105 may transmit any number of profiles, individually or in groups. Synchronous activity-based recommendation tool 105 may transmit these profiles based on preferences of the user, potential likelihood of the users matching, based on location, based on timing, based on whether users have taken any actions recently, or any other criteria.

At step 404, in some embodiments, synchronous-activity-based recommendation tool 105 creates a queue of user profiles. This queue of user profiles may be an order in which a user is intended to view profiles that have been transmitted as step 402. In some embodiments, synchronous-activity-based recommendation tool 105 transmits a queue of profiles, such as queues 330 and 340 in FIG. 3. The queues may be created by individual profiles being placed in a particular order, by profiles being sent in groups and added to the end of the queue for a user, or any listing or prioritizing of profiles.

At steps 406 and 408, in some embodiments, synchronous-activity-based recommendation tool 105 determines whether user 110 takes an action. Synchronous activity-based recommendation tool 105 may receive information related to actions of users 110 at interface 150 via network 120 from user device 115 of FIG. 1. As an example, synchronous-activity-based recommendation tool 105 may receive information that user 110A has opened an application in system 100 on user device 115A. As another example, synchronous-activity-based recommendation tool 105 may determine user 110A took an action within an application such as viewing profiles 130 of users 110, playing a game, messaging user 110B or any other interaction within system 100. In some embodiments, synchronous-activity-based recommendation tool 105 may determine whether another user, or any number of users, takes an action at steps 406 and 408. Synchronous activity-based recommendation tool 105 may wait to transmit profiles 130 of users 110 until two users (e.g., users 110A and 110B) or multiple users have taken an action. If synchronous-activity-based recommendation tool 105 determines at step 406 and 408 that user 110 has not taken an action, it remains at steps 406 and 408 until it determines that user 110 has taken an action. If, at steps 406 and 408, synchronous-activity-based recommendation tool 105 determines user 110 takes an action, the method continues to step 410. Synchronous activity-based recommendation tool 105 may repeat steps 406 and 408 for any number of users or be constantly monitoring the actions of users 110 to determine actions taken as an indication of availability within system 100 of FIG. 1.

At step 410, in some embodiments, synchronous-activity-based recommendation tool 105 determines whether the time between the actions taken at steps 406 and 408 is less than a threshold. Synchronous-activity-based recommendation tool 105 may determine the most recent action taken by user at step 406 and 408 and determine whether those have occurred within a threshold of time. The threshold may be any time period, including a few seconds, a few minutes, or a few hours. For example, if user 110A checks messages at two o'clock p.m., and user 110B opens an application within system 100 at 2:02 p.m., synchronous-activity-based recommendation tool 105 may determine at step 410, that the time between the actions is less than a threshold. If synchronous-activity-based recommendation tool 105 determines that the time is not less than a threshold, the method returns to step 406 to wait for one or more users to take an action. If, at step 410, synchronous-activity-based recommendation tool 105 determines the time between the actions is less than a threshold, the method continues to step 412.

At step 412, in some embodiments, synchronous-activity-based recommendations tool 105 transmits the profile of one user for display to another user. In some embodiments, this profile of a user may be one of the users who took an action in steps 406 or 408. Continuing the example from above, if both users take an action within a certain amount of time, synchronous-activity-based recommendation tool 105 may ensure that the profile of the first user is transmitted directly to the second user for display.

At step 414, in some embodiments, synchronous-activity-based recommendation tool 105 may place the profile of the user as the next profile in another user's queue. By placing it as the next profile in the queue, synchronous-activity-based recommendation tool 105 increases the likelihood that the user will view that profile sooner than if it were placed at the end of the queue. In some embodiments, synchronous-activity-based recommendation tool 105 may place the profile at the top of the queue, as the next profile in the queue, or at any place in the queue. In some embodiments, synchronous-activity-based recommendation tool 105 may place the profile as the next one in the queue so that the user viewing the profiles does not see any change on the currently-viewable profile.

At step 416, in some embodiments, synchronous-activity-based recommendation tool 105 may transmit profile of another user for display to the user. In some embodiments one or more aspects of step 416 may be implemented using one or more techniques discussed above with step 412. The user may be one or more users who took an action at step 406 or 408. At step 418, in some embodiments, synchronous-activity-based recommendation tool 105, may place the profile of the second user as the next profile in the queue of the first user. In some embodiments one or more aspects of step 418 may be implemented using one or more techniques discussed above, with respect to step 414 of method 400. Continuing the example from above, if both users take an action within a threshold, both profiles of those users may be sent to the other and placed as the next profile in that user's queue of profiles to review.

At step 420, in some embodiments, synchronous-activity-based recommendation tool 105 receives an indication of preference for the first queued profile in the queue of user 110. Synchronous activity-based recommendation tool 105 may receive an indication of preference at interface 150 via network 120 from user device 115. The first queued profile may be the profile that is currently the top profile or profile being displayed to the user. As an example, user 110A may indicate that he or she likes, dislikes, or passes on another user 110. In some embodiments, synchronous-activity-based recommendation tool 105 continues to display the first queued profile until it receives an indication of preference from user 110. In some embodiments, a lack of indication of preference may result in a "pass" indication or a "skip," allowing user 110 to view the next profile 130. Once synchronous-activity-based recommendation tool 105 receives either an indication of preference for the first queued profile or a pass, the method continues to step 422.

At step 422, in some embodiments, synchronous-activity-based recommendation tool 105 may display the profile of another user to the user. The user may be one or more users who took an action at step 406 or 408. By displaying the profile, a user may review the characteristics of that user before providing an indication of preference for that user.

At step 424, in some embodiments, synchronous-activity-based recommendation tool receives an indication of preference for the first queued profile from another user. The user may be one or more users who took an action at step 406 or 408. In some embodiments, one or more aspects of step 424 may be implemented using one or more techniques discussed above with respect to step 420. After receiving an indication of preference at step 424, synchronous-activity-based recommendation tool 105 displays the profile of the first user to the second user at step 426. In some embodiments, one or more aspects of step 426 may be implemented using one or more techniques discussed above with respect to step 422 of method 400. Continuing the example from above, if both users take actions within a certain time threshold at steps 406-410, the profiles of those users are transmitted the other users, and remain not visible until the user provides an indication on the currently-viewable profile. Once an indication of preference is received on that currently-viewable profile, the user who took an action in step 406 or 408 is displayed to the other user such that they are each viewing each other's profiles at or near the same time.

At steps 428 and 430, synchronous-activity-based recommendation tool 105 receives an indication of preference from the second user regarding the first user and from the first user regarding the second user. As discussed above, users may indicate a positive preference indication and negative preference indication or a pass. For example, user 110A may indicate a positive preference indication for user 110B, and user 110B may provide a positive preference indication for user 110A. In this scenario, the two users 110A and 110B have matched and are able to engage further. In some embodiments, at step 428, user 110B may indicate a negative preference for user 110A. In this scenario, the users are not further connected.

At step 432, in some embodiments, synchronous-activity-based recommendation tool 105 transmits a notification to users 110. This notification may include information about the preference indication received at step 428 and step 430. For example, if user 110A transmits a positive preference for 110B and if user 110B transmits a positive preference for user 110A, user 110B and user 110A may receive a notification that they have matched and that they have both expressed positive preference indications for the other. This notification may prompt user 110B to further engage and interact with user 110A, for example, by viewing profile 130A or sending a separate message to user 110A outside of interaction. In some embodiments, synchronous-activity-based recommendation tool 105 may transmit this notification to both users 110A and 110B. After step 432, method 400 ends.

Modifications, additions, or omissions may be made to the methods described herein without departing from the scope of the invention. For example, the steps may be combined, modified, or deleted where appropriate, and additional steps may be added. In an embodiment where synchronous-activity-based recommendation tool 105 places profile 130 of user 110 and the end of a queue, steps 414 and 418 may be omitted. As another example, in an embodiment where synchronous-activity-based recommendation tool 105 places profiles at the front of the queue, steps 420 and 424 may be omitted. Additionally, the steps may be performed in any suitable order without departing from the scope of the present disclosure. While discussed as synchronous-activity-based recommendation tool 105 performing the steps, any suitable component of system 100 may perform one or more steps of method 400.

Although the present disclosure includes several embodiments, myriad changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A system comprising:
an interface configured to transmit a queue of a plurality of profiles of users to a first user, the queue comprising a first queued profile and a second queued profile; and
a processor coupled to the interface, the processor configured to:
determine that a first user takes a first action at a first time;
determine that a second user takes a second action at a second time;
determine that a time period between the first time and the second time is less than a threshold;
in response to determining that the time period is less than the threshold:
cause to transmit a suggestion associated with the second user for display to the first user, wherein causing to transmit the suggestion associated with the second user for display to the first user comprises causing to transmit a profile of the second user to the queue for placement after the first queued profile and before the second queued profile, and, in response to receiving an indication of a preference of the first user for the first queued profile, display the profile of the second user; and
wherein the interface is further configured to, receive an indication that the first user approves of the suggestion associated with the second user.

2. The system of claim 1, further comprising a memory configured to store:
a profile of the first user; and
the profile of the second user, wherein, in response to determining that the first user takes the first action and the second user takes the second action, the processor is further configured to:
determine, based on the profile of the first user and the profile of the second user, a similarity measure between the first user and the second user;

determine that the similarity measure between the first user and the second user satisfies a condition associated with potential compatibility between the first user and the second user; and cause the transmission of the suggestion associated with the second user in response to determining that the similarity measure between the first user and the second user satisfies the condition.

3. The system of claim 1, wherein, in response to receiving the indication that the first user approves of the suggestion associated with the second user, the processor is further configured to enable communication between the first user and the second user.

4. The system of claim 3, wherein the communication between the first user and the second user comprises at least one of:

an exchange of messages comprising text between the first user and the second user; and an exchange of voice signals between the first user and the second user.

5. The system of claim 1, wherein the first action comprises at least one of:

transmitting information to the system;
receiving information from the system;
viewing a profile of a third user;
providing an indication of a preference for a profile of a fourth user;
opening an application on a mobile device;
accessing the Internet; and
accessing media data over the Internet.

6. The system of claim 1, wherein the interface is further configured to display to the first user an indication of the second user's activity.

7. The system of claim 6, wherein the indication of the second user's activity is at least one of:

an indication that the second user is online;
an indication that the second user is typing;
an indication that the second user is viewing a profile of the first user; and
an indication that the second user is accessing media data.

8. The system of claim 1, wherein:

causing to transmit the suggestion associated with the second user for display to the first user comprises causing to transmit a suggestion to access media data to the first user; and receiving the indication that the first user approves of the suggestion associated with the second user comprises receiving an indication that the first user accessed the media data.

9. A method comprising:

transmitting, by an interface, a queue of a plurality of profiles of users to a first user, the queue comprising a first queued profile and a second queued profile;

determining, by a processor, that the first user takes a first action at a first time;

determining, by the processor, that a second user takes a second action at a second time;

determining, by the processor, that a time period between the first time and the second time is less than a threshold;

in response to determining that the time period is less than the threshold:

causing to transmit a suggestion associated with the second user for display to the first user, wherein causing to transmit the suggestion associated with the second user for display to the first user comprises causing to transmit a profile of the second user to the queue for placement after the first queued profile and before the second queued profile, and, in response to receiving an indication of a preference of the first user for the first queued profile, displaying the profile of the second user; and in response to causing to transmit the suggestion associated with the second user to the first user, receiving, by the interface, an indication that the first user approves of the suggestion associated with the second user.

10. The method of claim 9, further comprising, in response to determining that the first user takes the first action and the second user takes the second action:

determining, by the processor, based on a profile of the first user and the profile of the second user, a similarity measure between the first user and the second user;

determining, by the processor, that the similarity measure between the first user and the second user satisfies a condition associated with potential compatibility between the first user and the second user; and causing the transmission of the suggestion associated with the second user in response to determining that the similarity measure between the first user and the second user satisfies the condition.

11. The method of claim 9, wherein, in response to receiving the indication that the first user approves of the suggestion associated with the second user, the method further comprises enabling communication between the first user and the second user.

12. The method of claim 9, wherein the first action comprises at least one of:

transmitting information to the system;
receiving information from the system;
viewing a profile of a third user;
providing an indication of a preference for a profile of a fourth user;
opening an application on a mobile device;
accessing the Internet; and
accessing media data over the Internet.

13. The method of claim 9, wherein:

causing to transmit the suggestion associated with the second user for display to the first user comprises causing to transmit a suggestion to access media data to the first user; and receiving the indication that the first user approves of the suggestion associated with the second user comprises receiving an indication that the first user accessed the media data.

14. At least one non-transitory computer-readable medium comprising a plurality of instructions that, when executed by at least one processor, are configured to:

transmit a queue of a plurality of profiles of users to a first user, the queue comprising a first queued profile and a second queued profile;

determine that the first user takes a first action at a first time;

determine that a second user takes a second action at a second time;

determine that a time period between the first time and the second time is less than a threshold;

in response to determining that the time period is less than the threshold, cause to transmit a suggestion associated with the second user for display to the first user, wherein causing to transmit the suggestion associated with the second user for display to the first user comprises causing to transmit a profile of the second user to the queue for placement after the first queued profile and before the second queued profile, and, in response to receiving an indication of a preference of the first user for the first queued profile, display the profile of the second user;

in response to causing to transmit the suggestion associated with the second user to the first user, receive an indication that the first user approves of the suggestion associated with the second user; and in response to receiving the indication that the first user approves of the suggestion associated with the second user, enable communication between the first user and the second user.

15. The at least one non-transitory computer-readable medium of claim 14, wherein the instructions are further configured, in response to determining that the first user takes the first action and the second user takes the second action, to:

determine, based on a profile of the first user and the profile of the second user, a similarity measure between the first user and the second user;

determine that the similarity measure between the first user and the second user satisfies a condition associated with potential compatibility between the first user and the second user; and cause the transmission of the suggestion associated with the second user in response to determining that the similarity measure between the first user and the second user satisfies the condition.

16. The at least one non-transitory computer-readable medium of claim 14, wherein the first action comprises at least one of:

transmitting information to the system;

receiving information from the system;

viewing a profile of a third user;

providing an indication of a preference for a profile of a fourth user;

opening an application on a mobile device;

accessing the Internet; and accessing media data over the Internet.

17. The at least one non-transitory computer-readable medium of claim 14, wherein:

causing to transmit the suggestion associated with the second user for display to the first user comprises causing to transmit a suggestion to access media data to the first user; and receiving the indication that the first user approves of the suggestion associated with the second user comprises receiving an indication that the first user accessed the media data.

* * * * *